United States Patent
Chan et al.

(10) Patent No.: US 9,923,710 B2
(45) Date of Patent: Mar. 20, 2018

(54) DIGITAL OVERSAMPLING CLOCK AND DATA RECOVERY CIRCUIT

(71) Applicant: Silicon Laboratories Inc., Austin, TX (US)

(72) Inventors: Hua Beng Chan, Singapore (SG); Rex Wong Tak Ying, Singapore (SG); Ricky Setiawan, Singapore (SG); Obaida Mohammed Khaled Abu Hilal, Singapore (SG)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/182,951

(22) Filed: Jun. 15, 2016

(65) Prior Publication Data

US 2017/0366330 A1    Dec. 21, 2017

(51) Int. Cl.
*H04L 7/00* (2006.01)
*H04B 10/61* (2013.01)

(52) U.S. Cl.
CPC ....... *H04L 7/0008* (2013.01); *H04B 10/6165* (2013.01)

(58) Field of Classification Search
CPC .......... H04L 7/0008; H04B 10/6165
See application file for complete search history.

(56) References Cited

U.S. PATENT DOCUMENTS

| 8,494,105 | B1* | 7/2013 | Patterson | H03D 13/002 |
| | | | | 375/294 |
| 2002/0131538 | A1* | 9/2002 | Staszewski | H03L 7/085 |
| | | | | 375/355 |
| 2003/0107442 | A1* | 6/2003 | Staszewski | H03L 7/085 |
| | | | | 331/1 A |
| 2003/0133522 | A1* | 7/2003 | Staszewski | H03L 7/085 |
| | | | | 375/345 |
| 2003/0141936 | A1* | 7/2003 | Staszewski | H03L 7/0991 |
| | | | | 331/16 |
| 2004/0090277 | A1* | 5/2004 | Tsyrganovich | H03D 13/001 |
| | | | | 331/74 |
| 2009/0180783 | A1* | 7/2009 | Huang | H04L 7/0338 |
| | | | | 398/155 |

(Continued)

OTHER PUBLICATIONS

Microchip Technology, Inc., "Introduction to USB Type-C™—AN1953," Jan. 30, 2015, 20 pages.

(Continued)

*Primary Examiner* — Kenneth Lam
(74) *Attorney, Agent, or Firm* — Trop, Pruner & Hu, P.C.

(57) ABSTRACT

In one aspect, an apparatus includes: a first time-to-data converter (TDC) to oversample a first duration of incoming data and hold the oversampled first duration during receipt of a second duration of the incoming data; a second TDC to oversample the second duration of the incoming data and hold the oversampled second duration during receipt of a third duration of the incoming data; a processing circuit coupled to the first and second TDCs, the processing circuit including a first filter to filter the oversampled first duration and the oversampled second duration and generate a control output therefrom; and a digitally controlled oscillator (DCO) coupled to the processing circuit to receive the control output and generate a recovery clock signal therefrom.

17 Claims, 8 Drawing Sheets

(56) References Cited

U.S. PATENT DOCUMENTS

| | | | | |
|---|---|---|---|---|
| 2010/0040182 A1* | 2/2010 | Yang | ..................... | H03L 7/0814 |
| | | | | 375/355 |
| 2013/0272368 A1* | 10/2013 | Yang | ................... | H04B 14/026 |
| | | | | 375/238 |
| 2014/0375365 A1* | 12/2014 | Liu | ......................... | H03K 5/01 |
| | | | | 327/141 |
| 2015/0197083 A1* | 7/2015 | Otsuka | ................ | B41J 2/04541 |
| | | | | 347/10 |
| 2016/0094333 A1* | 3/2016 | Nakama | ............... | H04L 7/0337 |
| | | | | 375/371 |
| 2016/0308668 A1* | 10/2016 | Kim | ......................... | H04L 7/02 |

OTHER PUBLICATIONS

USB 3.0 Promoter Group, USB Type-C Cable and Connector Specification, "Universal Serial Bus Type-C Cable and Connector Specification," Revision 1.2 Mar. 25, 2016, 221 pages.

U.S. Appl. No. 15/182,970, filed Jun. 15, 2016, entitled "Controlling a Reference Voltage for a Clock and Data Recovery Circuit," by Hua Beng Chan, et al.

\* cited by examiner

DIGITAL OVERSAMPLING CLOCK AND DATA RECOVERY CIRCUIT

BACKGROUND

Various interconnection systems provide for communication of data and some also provide for power delivery The Universal Serial Bus Type-C specification provides for communication and power delivery using a single-ended receiver circuit to communicate data. This data is provided with an embedded clock signal, which operates at 600 kilohertz (kHz). However, this communication suffers from jitter, frequency drift and ground shifting in the data. As such, it is difficult for a receiver to recover the clock and retime the received data, since a general-purpose receiver is focused on instruction speed, low power and small area, rather than providing the USB Type-C reference clock. Thus, a conventional phase locked loop (PLL) or delay locked loop (DLL)-based clock and data recovery circuit (CDR) cannot work properly without the reference clock. In addition, a conventional CDR does not have fast phase track capability and is affected by fast events, for example, cycle-to-cycle jitter, fast frequency drift and ground shifting.

SUMMARY OF THE INVENTION

In one aspect, an apparatus includes: a first time-to-data converter (TDC) to oversample a first duration of incoming data and hold the oversampled first duration during receipt of a second duration of the incoming data; a second TDC to oversample the second duration of the incoming data and hold the oversampled second duration during receipt of a third duration of the incoming data, the first and second TDCs to operate in opposing phases; a processing circuit coupled to the first TDC and the second TDC, the processing circuit including a first filter to filter the oversampled first duration and the oversampled second duration and generate a control output therefrom; and a digitally controlled oscillator (DCO) coupled to the processing circuit to receive the control output and generate a recovery clock signal therefrom.

In an implementation, a data sampler may be configured to receive the incoming data and sample the incoming data according to the recovery clock signal. The apparatus may further include a selector coupled between the first and second TDCs and the processing circuit. The processing circuit may further include a second filter to filter an output of the first filter.

In an implementation, the first filter is configured to be in a first filter configuration when the incoming data comprises a preamble and to be in a second filter configuration when the incoming data comprises random data. In the first filter configuration, the first filter is to filter a first plurality of the oversampled first and second durations of the preamble, and in the second filter configuration the first filter is to filter a second plurality of the oversampled first and second durations of the random data, the second plurality smaller than the first plurality. The first plurality of the oversampled first and second durations may include single bit durations and multi-bit durations and the second plurality of the oversampled first and second durations may include single bit durations.

In an implementation, the apparatus further includes: a first edge detector to detect a first edge in the incoming data; and a first counter to count the first duration of the incoming data, the counter to be clocked by a system clock signal, the system clock signal having a frequency substantially greater than a frequency of the recovery clock signal. The apparatus may further include a logic circuit coupled between the first TDC and the processing circuit, the logic circuit to generate a count value for the first duration of the incoming data, the count value comprising a deviation from a predetermined ratio between the system clock signal and the recovery clock signal. In an example, the incoming data comprises bi-phase mark coded (BMC) data.

In an implementation: the first TDC is to oversample the first duration of incoming data responsive to a first edge in the incoming data; and the second TDC is to oversample the second duration of incoming data responsive to a second edge in the incoming data. The first TDC may be asynchronously reset responsive to the first edge to perform phase tracking and further responsive to a predetermined count value of a counter of the first TDC.

In another aspect, an apparatus includes: an analog front end to receive a digital input, the analog front end to output a data stream from the digital input; a first counter to count a first count value corresponding to a first duration of a sample of the data stream responsive to detection of a first edge in the data stream, where the first counter is to be asynchronously reset responsive to the first edge detection; a second counter to count a second count value corresponding to a second duration of another sample of the data stream responsive to detection of a second edge in the data stream, where the second counter is to be asynchronously reset responsive to the second edge detection; a filter to filter a count value obtained based at least in part on the first count value and the second count value; and a DCO to generate a recovery clock signal from the filtered count value.

In an implementation, the apparatus comprises a clock and data recovery circuit having an open loop configuration, the clock and data recovery circuit further comprising: a first summer to receive the first count value and sum the first count value with a first predetermined value to generate the count value, the first predetermined value comprising a ratio between a system clock signal and the recovery clock signal; and a second summer to receive the filtered error value and sum the filtered error value with the first predetermined value to generate a summed filtered count value, and provide the summed filtered count value to the digitally controlled oscillator.

In another implementation, the apparatus comprises a clock and data recovery circuit having a closed loop configuration, the clock and data recovery circuit further comprising: a first summer to receive the first count value and sum the first count value with a first feedback signal to generate the count value; and a second summer to receive the filtered count value and sum the filtered count value with a first predetermined value to generate the first feedback signal, where the filtered count value comprises the first feedback signal to be provided to the digitally controlled oscillator, the first predetermined value comprising a ratio between a system clock signal and the recovery clock signal.

In another aspect, at least one computer readable storage medium comprises instructions that when executed enable a system to: oversample a first duration of incoming data in a first TDC and hold the oversampled first duration during receipt of a second duration of the incoming data; oversample the second duration of the incoming data in a second TDC and hold the oversampled second duration during receipt of a third duration of the incoming data, where the first and second TDCs are to operate in opposing phases; filter the oversampled first duration and the oversampled second duration in a first filter coupled to the first and second TDCs and generate a control output therefrom; and generate a recovery clock signal in a DCO signal based at least in part on the control output.

In an implementation, the at least one computer readable medium further comprises instructions that when executed enable the system to receive the incoming data and sample the incoming data according to the recovery clock signal in a data sampler. Additional instructions enable the system to configure the first filter to be in a first filter configuration when the incoming data comprises a preamble and to be in a second filter configuration when the incoming data comprises random data. Still further instructions enable the system to: provide a system clock signal to the first and second TDCs, the system clock signal having a substantially greater frequency than the recovery clock signal; and provide a reference value to adjust the oversampled first duration and the oversampled second duration, the reference value corresponding to a ratio between the system clock signal and the recovery clock signal.

DETAILED DESCRIPTION

In various embodiments, a receiver is provided with a combined analog front end (AFE) and digital clock and data recovery (CDR) circuit that enables accurate clock recovery and data tracking/sampling with high efficiency and low power consumption and complexity. To this end, such CDR circuit can be implemented in an open loop configuration in some cases to further reduce complexity. In addition, the need for an accurate reference clock can be avoided, as an oversampling technique can be used within the CDR. Embodiments may be flexible and use any available system clock signal, as an exact frequency of this signal does not affect proper operation. Embodiments further relax timing constraints of signal processing using a time-to-digital (TDC) pipeline structure. Embodiments may further account for jitter, ground shifting and frequency drift using an asynchronous reset technique, as described herein. As such, embodiments provide a fast phase track, reference-less CDR with large jitter tolerance.

Particular embodiments described herein are in connection with implementation for receipt of data via a USB Type-C port. However understand that embodiments may apply equally to other source asynchronous data communication systems.

Figure 1:
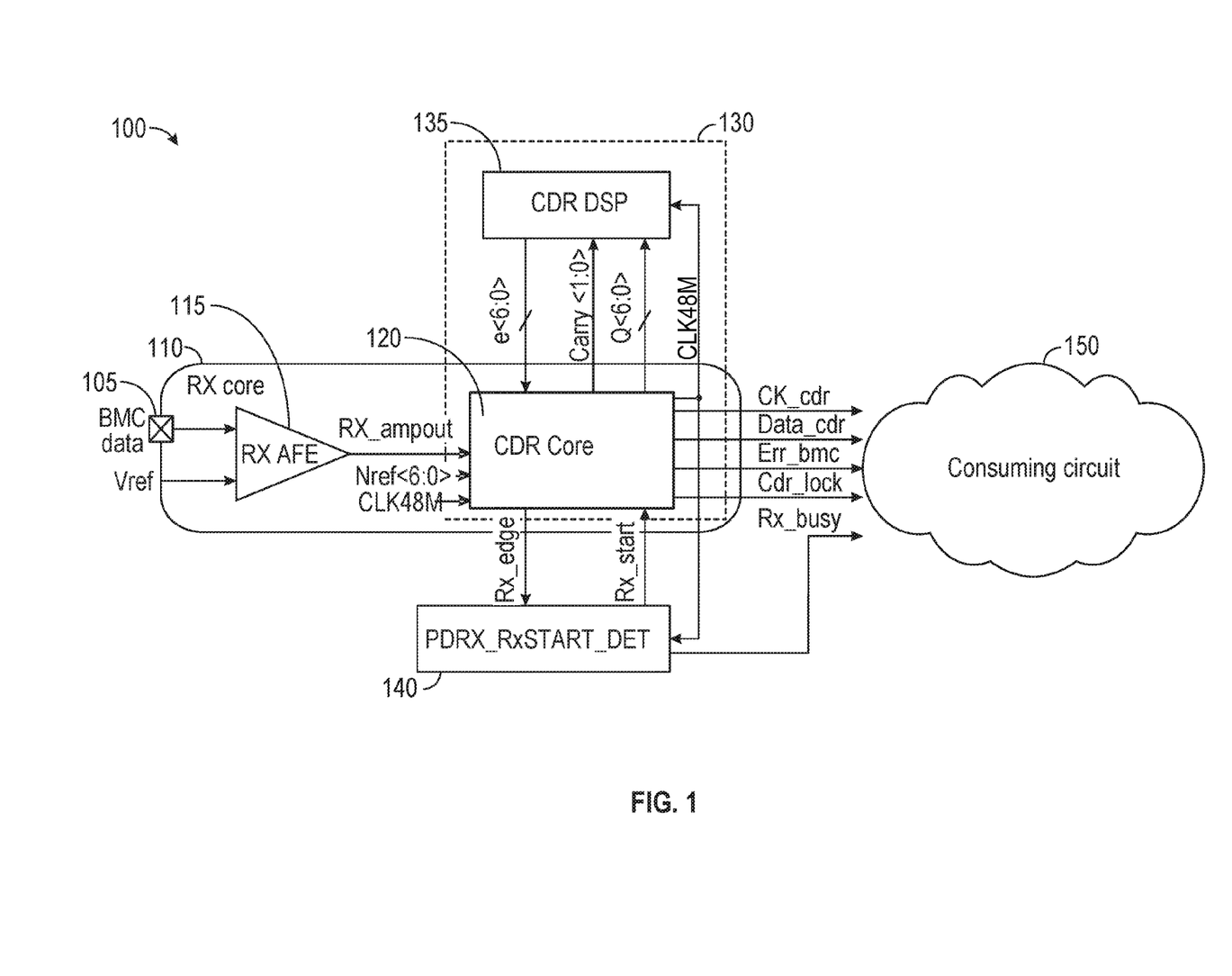
FIG. 1 is a block diagram of a high level view of a portion of a receiver in accordance with an embodiment.

Referring now to FIG. 1, shown is a block diagram of a high level view of a portion of a receiver in accordance with an embodiment. More specifically, receiver 100 may be part of a given device or component of a computing system, or component to be coupled to a given system. As an example, receiver 100 may be an integrated circuit (IC) to perform given functionality and provide a communication path with one or more other devices. One such communication path may include a USB Type-C plug, in which data and power can be communicated.

More specifically as shown in FIG. 1, data in the form of bi-phase mark coded (BMC) data can be received via an input pad 105. As seen, this incoming single-ended data is provided to a receiver core 110, itself formed of an analog front end (AFE) 115 and a clock and data recovery (CDR) circuit 130. More specifically, an embodiment of CDR circuit 130 includes digital CDR circuits 120 and 135 (namely CDR core 120 and CDR digital signal processor (DSP) 135). Various functionality may be performed within such CDR circuitry to both recover a clock signal embedded within the incoming BMC data, and recover a data portion of the communication. In this way, a recovery clock signal (CK_cdr) and underlying data (Data_cdr) can be provided to a consuming circuit 150, which may be a given functional unit of the device. In addition, receiver core 110 may further provide an error signal (Err_bmc) and a clock locked signal (CDR_lock) for communication to consuming circuit 150.

As further illustrated in FIG. 1, to enable clock and data recovery, CDR circuit 120 further receives a reference clock (CLK48M). As will be described herein, this reference clock may be a given system clock signal of device 100 and may be provided without any particular accuracy. In addition, a reference count value is also received by CDR circuit 120. As will be described herein, a reference count value (Nref<6:0>) may be set at a predetermined value. This predetermined value may correspond to a ratio between a clock signal at which the incoming BMC data is received (which in an embodiment may be at a rate of 600 kilohertz (KHz)) and the corresponding system clock signal (which in an embodiment may be at 48 megahertz (MHz)). As such, in one embodiment this reference value may be predetermined and fixed at a value of 80 (and as seen may be communicated as a 7 bit value). In one embodiment, this reference count value can be received, e.g., from firmware that executes in receiver 100.

In a particular embodiment for use with USB Type-C interconnects, understand that input pad 105 may couple to a configuration channel (CC) of the USB plug/receptacle, over which an initial power relationship between devices can occur. And, via a power delivery negotiation such as entry into a USB Power Delivery Explicit Contract, also occurring via this channel, the devices can establish management of power delivery, including the power roles of the different devices (e.g., neutral, sink and/or source), the power level of power delivery to be communicated (e.g., in terms of current (Amperes)), downstream facing port (DFP) and upstream facing port (UFP) role swap, change of port sourcing a bus voltage (VBUS), change of port sourcing Vconn, and communication with cables.

As further illustrated, receiver 100 also includes a digital RX start detection circuit 140 which may communicate a receiver start signal (Rx_start) to CDR 120 responsive to RX_edge, which provides short pulses at the rising and falling edges of AFE output 115 (RX_ampout). As further illustrated, RX start detection circuit 140 receives an edge triggered signal (Rx_edge) from CDR circuit 120. RX start detection circuit 140 further communicates a receiver busy signal (Rx_busy) to consuming circuit 150. Understand while shown at this high level in the embodiment of FIG. 1, many variations and alternatives are possible.

As will be described herein, CDR circuit 130 may provide clock and data recovery in an efficient manner, with reduced power consumption and reduced area for the circuitry. Still further, embodiments of receiver CDR circuit 130 can perform clock and data recovery in a noisy signal environment with an open loop configuration, while ensuring that the received clock can be recovered with high accuracy.

Figure 2:
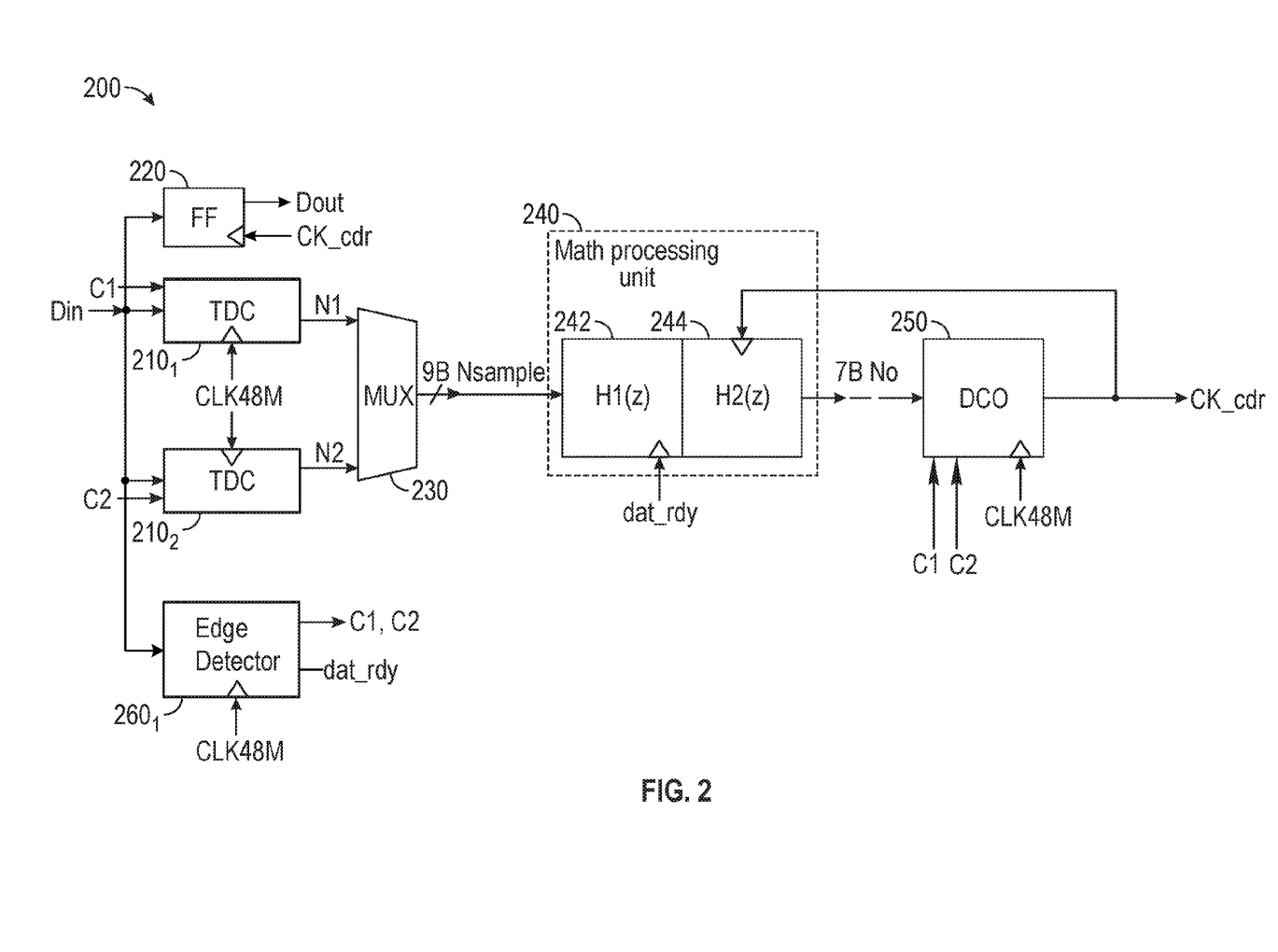
FIG. 2 is a block diagram of a portion of a CDR circuit in accordance with an embodiment.

Referring now to FIG. 2, shown is a block diagram of a portion of a CDR circuit 130 in accordance with an embodiment. More specifically circuit 200 shown in FIG. 2 is at least a portion of a digital portion of CDR circuit. As illustrated, the incoming data (Din) is received, e.g., via an off-chip source, such as a given pin of an IC coupled to a USB Type-C connector. In turn, this incoming data is received in circuit 200 from an AFE, such as AFE 115 of FIG. 1. As illustrated, this incoming data, having an embedded clock therein, is provided to a pair of time-to-digital converters (TDCs) $210_1$, $210_2$. Each of these TDCs 210 can be configured to perform a time-to-digital conversion based on a respective edge in the incoming data stream. Namely, TDC $210_1$ is configured as a positive edge detection-based converter, while TDC $210_2$ is configured as a negative edge detection-based converter.

As illustrated, each TDC 210 is configured to receive an incoming clock signal, which may be the received system clock signal, which in an embodiment operates at 48 MHz. As further illustrated, the incoming data is also provided to a data sampler 210, which in an embodiment may be implemented as a D-type flip-flop, to sample and output the recovered data (Dout). In this way, recovered data may be provided to one or more locations within the receiver. As seen, sampler 220 is configured to be clocked by the recovery clock signal (CK_cdr) recovered from the incoming data. In general, TDCs 210 are each configured to perform counting for a duration determined based on an edge detected in the incoming data. Each TDC 210 is configured to generate a count value respectively, corresponding to a difference between a predetermined value and the accumulated count value within the TDC for a given data sample.

This count value is provided through a selection circuit 230, which in an embodiment is implemented as a multiplexer, to a math processing unit 240 (which in an embodiment may be a portion of CDR DSP 135 of FIG. 1). More specifically, this value may be passed as a 9 bit value (Nsample) (formed of Q<6:0> and Carry<1:0> as in FIG. 1). As seen, this value is provided to math processing unit 240. In the embodiment shown, math processing unit 240 in FIG. 2 includes a first filter 242 (H1($z$)) and a second filter 244 (H2($z$)). First filter 242 may be controlled differently depending upon the type of incoming data. As will be described herein, when incoming data is of a predetermined value, such as preamble information, first filter 242 may be configured as a fifth-order finite impulse response (FIR) filter, clocked by a data ready signal (Dat_rdy) received from an edge detector 260. This configuration is used in preamble mode as all values in both one bit duration and two bit duration are taken in for fast frequency tracking. Since every consecutive six samples are DC balanced, first filter 242 is configured as a fifth-order FIR in this case. As seen, edge detector 260 provides the asynchronous short pulses C1 and C2 at the rising and falling edge of Din, respectively and also provides dat_rdy which is the synchronous pulse at edges of Din with CLK48M. Instead, when data having an unknown value is received (namely normal data) first filter 242 may be configured as a third-order FIR filter in this case. This configuration is used for random data as the values in one bit duration are only taken in for frequency tracking. Since every consecutive four samples of one bit duration are DC balanced, first filter 242 is configured as a third-order FIR. As described below, pulses C1 and C2 are used to reset asynchronously TDC $210_1$ and $210_2$ respectively before the next counting operations.

In both cases of data, namely whether the incoming data is preamble information or unknown data, second filter 244 may be configured as a low pass filter (LPF) such as a first-order infinite impulse response (IIR) filter to further smooth the output of filter 242. As such, the output of math processing unit 240 is an average of a frequency of the incoming data, which may be provided as a 7-bit value (No) to a digitally controlled oscillator (DCO) 250. Note that the initial output of processing unit 240 is configured to be Nref. As seen, DCO 250 is clocked with the system clock signal and may be configured to output the recovery clock signal CK_cdr, which as seen may be provided to clock second filter 244. As further illustrated, it is this recovered clock signal that is used to sample the incoming data in sampler 220. Although shown at this high level in the embodiment of FIG. 2, many variations and alternatives are possible.

Figure 3:
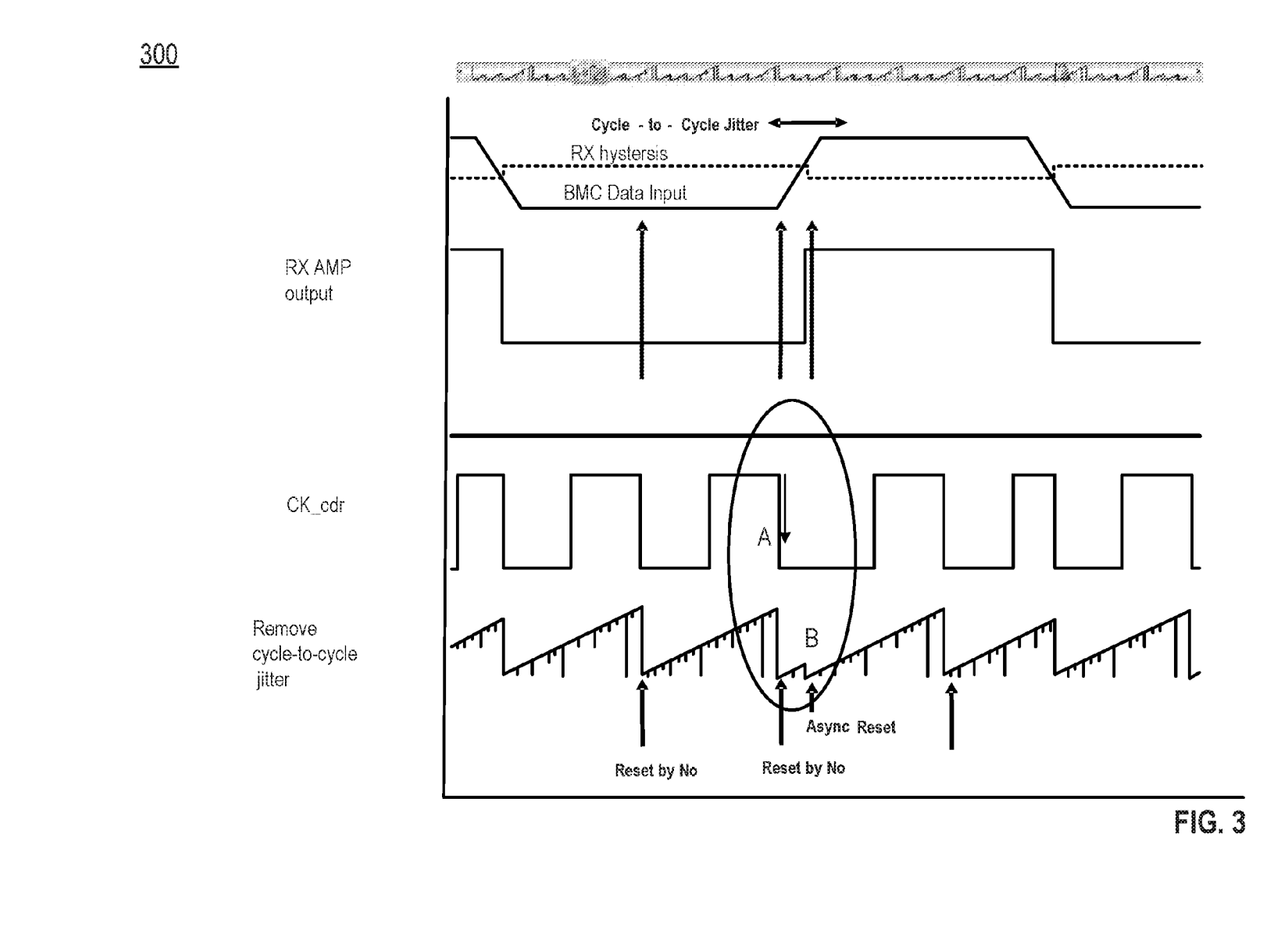
FIG. 3 is a graphical illustration of an asynchronous reset in accordance with an embodiment.

The period of DCO 250 is defined by No. The start/reset of each DCO clock is set by the asynchronous resets C1 or C2, or by reaching the value of No. The rising edge of the DCO clock is fixed at No/2. Since the cycle-to-cycle jitter and BMC frequency and ground shifting occur, the falling edge of DCO clock is purposely designed to remove them before receipt of the next BMC data. Referring now to FIG. 3, shown is a graphical illustration of an asynchronous reset in accordance with an embodiment. As shown in FIG. 3, a longer BMC data period T+ΔT is present. After the falling edge A triggered by No, DCO 250 operates to recount the extra period ΔT at point B. If ΔT is less than No/2, the rising edge will not come out. When the asynchronous reset occurs before No/2, this extra period is eliminated before receipt of the next BMC data. As a result, no DCO clock misalignment occurs. The protection margin is slightly less than No/2. In this way, fast phase tracking is achieved.

Figure 4A:
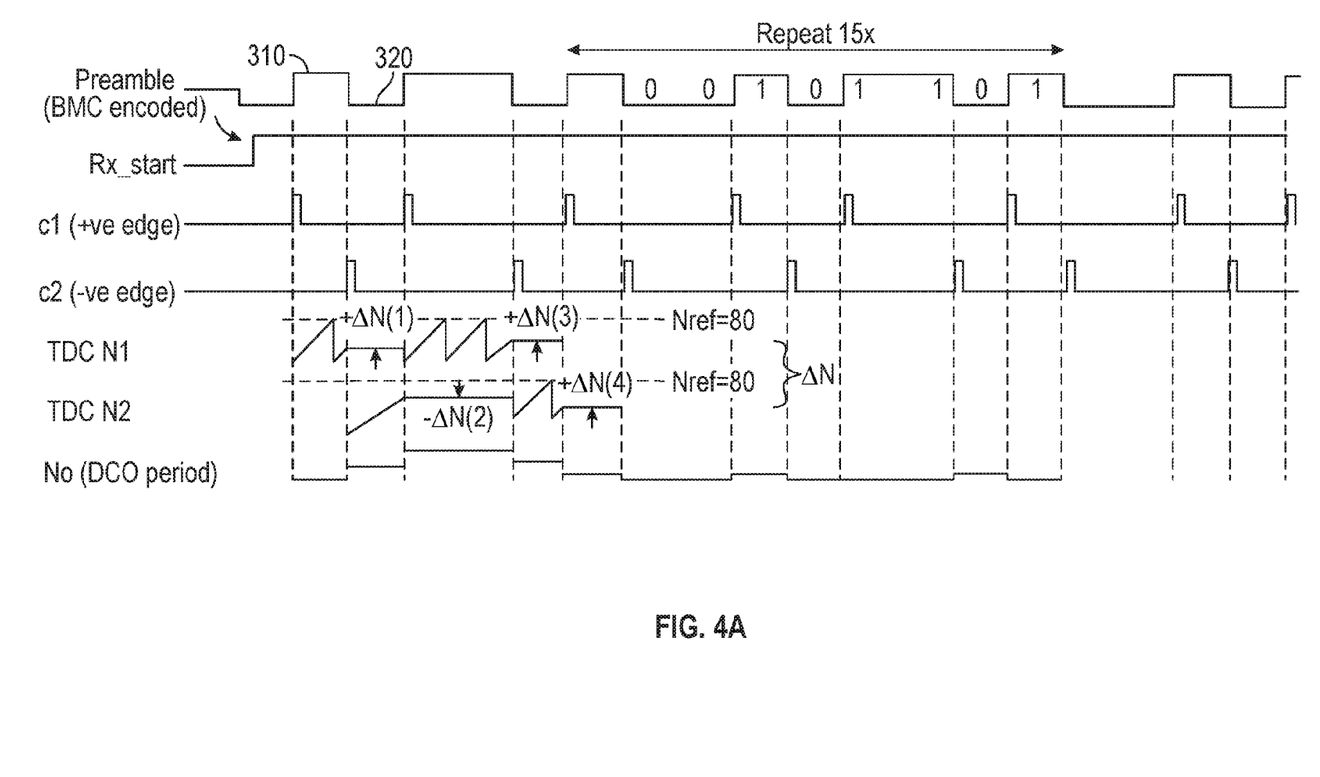
FIG. 4A is a preamble timing diagram illustrating operation of a CDR circuit in accordance with an embodiment.

Referring now to FIG. 4A, shown is a timing diagram illustrating operation of a CDR circuit in accordance with an embodiment. As illustrated in FIG. 4A, the timing diagram shows operation of the CDR circuit when an incoming data stream is preamble data that is BMC encoded. As illustrated, the preamble data may be provided as a repeating stream (e.g., 15 times, in one embodiment) to enable receiver locking operations to be performed. For a USB Type-C port, this preamble data may be a repeating string of logic 0 and logic 1 values, some of which are multiple (2) bit durations and some of which are single bit durations. Note that in an embodiment, a unit interval (UI) for two bits of information may be approximately 3.3 microseconds (μs) with a half UI being half that value. Note that with a system clock signal of 48 MHz, this corresponds to a unit interval of approximately 20 nanoseconds (ns). As illustrated, operation during this preamble receipt begins with a start signal (Rx_start) generated by detection circuit 140. Next, edge triggered pulses, namely a first edge pulse train C1, is generated by a positive edge detector present in detection circuit 260. As illustrated, this edge detector for first TDC $210_1$ may generate pulses (as illustrated in waveform C1) responsive to detection of rising edges within the preamble. In an embodiment, such edge detector may be implemented as a monostable multivibrator or one-shot circuit. Of course other implementations of an edge detector are possible. In turn, a negative edge detector present in detection circuit 260 is used to generate pulses for a second TDC $210_2$ (as illustrated in waveform C2) responsive to detection of falling edges within the preamble.

Still referring to FIG. 4A, the timing illustration further shows counting operations that are performed in opposite phases by the two TDCs. Namely a first TDC (e.g., TDC $210_1$ in the embodiment of FIG. 2) that is triggered by the positive going edges counts a duration of such positive data samples within the preamble. In turn, a second TDC (e.g., TDC $210_2$ in the embodiment of FIG. 2) that is triggered by the negative edges counts a duration of such negative data samples within the preamble. As seen, such counters may be configured to count to a maximum count value defined by Nref (which in an embodiment may be a 9 bit counter to count to a maximum value of 511. In other cases Nref may be set to 55 or 80 or 111 or 127. Thus during a first data sample 310, a first TDC counts to Nref, and then is reset and continues counting, until a transition occurs in the preamble, at which point a second TDC begins counting a second data sample 320.

Note that during this second phase of operation when the second TDC is actively counting, the first TDC holds its count value (N1) from first data sample 310 (and with reference back to FIG. 2, outputs such value through selection circuit 230 to math processing unit 240). And the second TDC operates in opposition to the first TDC to count and hold a count value (N2). As such, there are two parallel TDCs that count the respective successive data periods. As will be described herein, the count values provided by both TDCs (both for one-bit duration samples as well as for two-bit duration samples (namely N)) are processed downstream for fast frequency tracking during preamble processing.

As further illustrated in FIG. 4A, the resulting DCO period varies for each data sample, but quickly tracks to a relatively minimal amount of jitter or phase change. Understand while shown with these particular examples and illustrated timing in FIG. 4A, many variations and alternatives are possible.

Figure 4B:
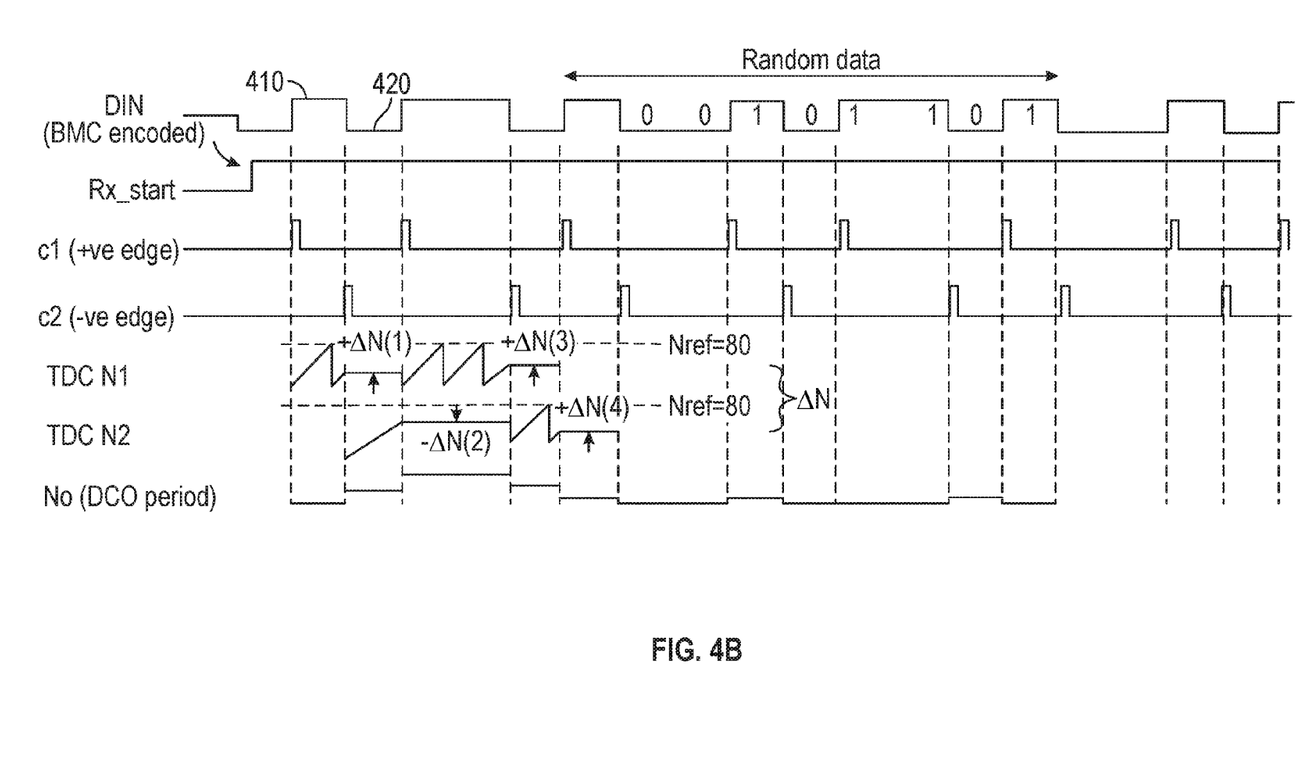
FIG. 4B is a data timing diagram illustrating operation of a CDR circuit in accordance with an embodiment.

Referring now to FIG. 4B, shown is a timing diagram illustrating operation of a CDR circuit in accordance with another embodiment. As illustrated in FIG. 4B, the timing diagram shows operation of the CDR circuit when an incoming data stream is a regular data portion of a BMC encoded message. As such this data is assumed to be random data, in contrast to the predetermined repeating preamble stream. Operation may proceed the same as described above as to FIG. 4B for incoming data such as data samples 410 and 420. Note however, that for this random data, only single bit duration errors are processed for frequency tracking here.

Figure 5:
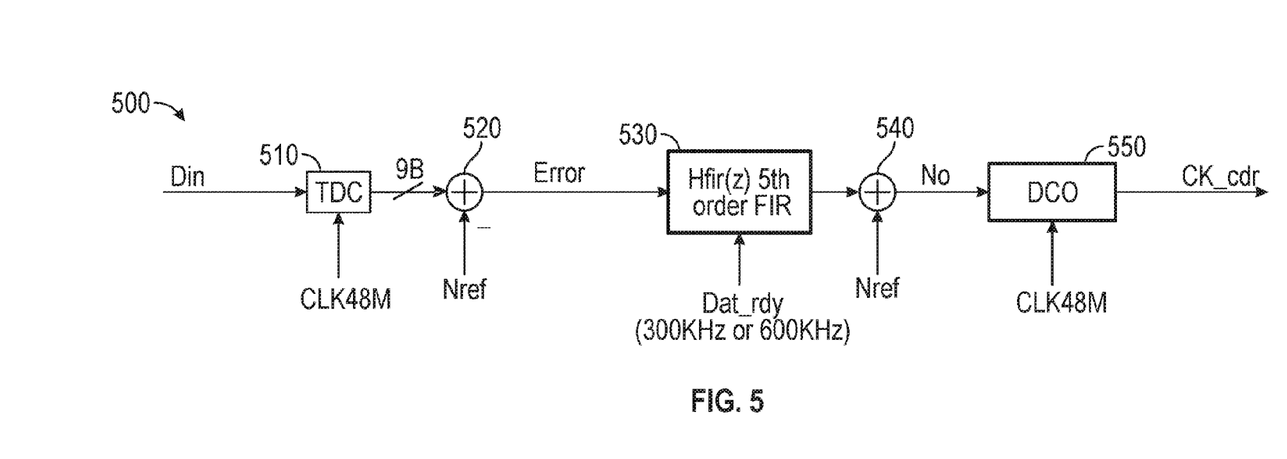
FIG. 5 is a block diagram of a receiver circuit in accordance with another embodiment.

Referring now to FIG. 5, shown is a block diagram of a receiver circuit in accordance with another embodiment. More specifically, receiver circuit 500 of FIG. 5 shows an open loop configuration for a digital CDR architecture as described herein. Incoming data (as provided via an analog front end) is received in a TDC 510. Understand that TDC 510 may include multiple separate TDCs that operate out of phase with each other. Specifically in one embodiment two such TDCs may be provided, each of which operates to independently sample and hold different portions of the incoming data. As illustrated, TDC 510 may be clocked by a given system clock signal (e.g., a 48 MHz clock signal in an embodiment). As illustrated, TDC 510 outputs duration information, e.g., in the form of a count value, such as a 9-bit count value. This count value is provided to an adder 520 that may be configured to subtract a reference count value, Nref. In an embodiment, Nref equals 80. As such, the output of adder circuit 520 is an error signal corresponding to a deviation from a predetermined ratio (of system clock signal to recovery clock signal). This error signal is then filtered in a filter 530. In various embodiments, a single configurable filter is provided, which may be dynamically configured with different orders depending on whether the incoming data is preamble information or unknown data. In other cases, in addition to a configurable FIR filter, an additional IIR low pass filter may further filter the output of the FIR filter. As illustrated, filter 530 may be clocked by a given clock signal. In an embodiment, this Dat_rdy clock signal may correspond to a synchronization of the edge detection pulses synchronized to the system clock signal with a 2Tck delay. In an embodiment, filter 530 may receive a predetermined number of samples for DC balance in BMC coding. Filter 530 filters out the jitter/noise at a frequency of this clock signal divided by number of samples. The filtered output is provided to another adder circuit 540, which may similarly be configured to add the predetermined reference value, such that a value No corresponding to a clock period is provided to a digitally controlled oscillator 550 (similarly clocked by the system clock signal), such that the resulting output is the clock recovery signal (CK_cdr). As such, DCO 550 operates using No as the receiver recovery clock period.

Figure 6:
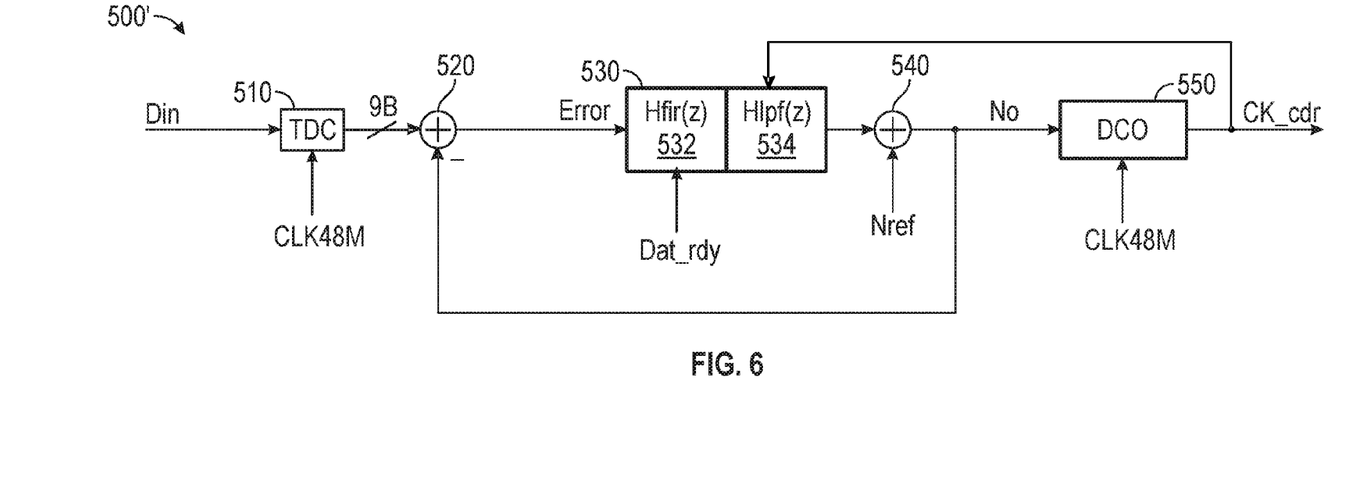
FIG. 6 is a block diagram of a receiver circuit in accordance with another embodiment.

In other embodiments, a digital CDR architecture may provide a closed loop configuration. Referring now to FIG. 6, shown is a block diagram of a receiver circuit in accordance with another embodiment. As shown in FIG. 6, receiver 500' may be implemented similarly as in FIG. 5. However, note that FIG. 6 details a closed loop architecture. Furthermore, note details regarding filter 530, which is formed of multiple independent filters, namely a first FIR filter 532 and a first order low pass filter 534. The other components may be the same as in FIG. 5. However, note that instead of receiving a predetermined reference value in adder circuit 520, a feedback value, No, is provided from the output of adder circuit 540 back to adder circuit 520 to enable determination of the error signal to be provided to filter 530. And the resulting recovery clock signal may be used to clock low pass filter 534 for accumulation and filtering. By using previous and current samples for this calculation of the recovery clock period, if there is a sudden interference, filter 530 may efficiently remove such interference. Understand while shown at this high level in the embodiment of FIG. 6, many variations and alternatives are possible.

Figure 7:
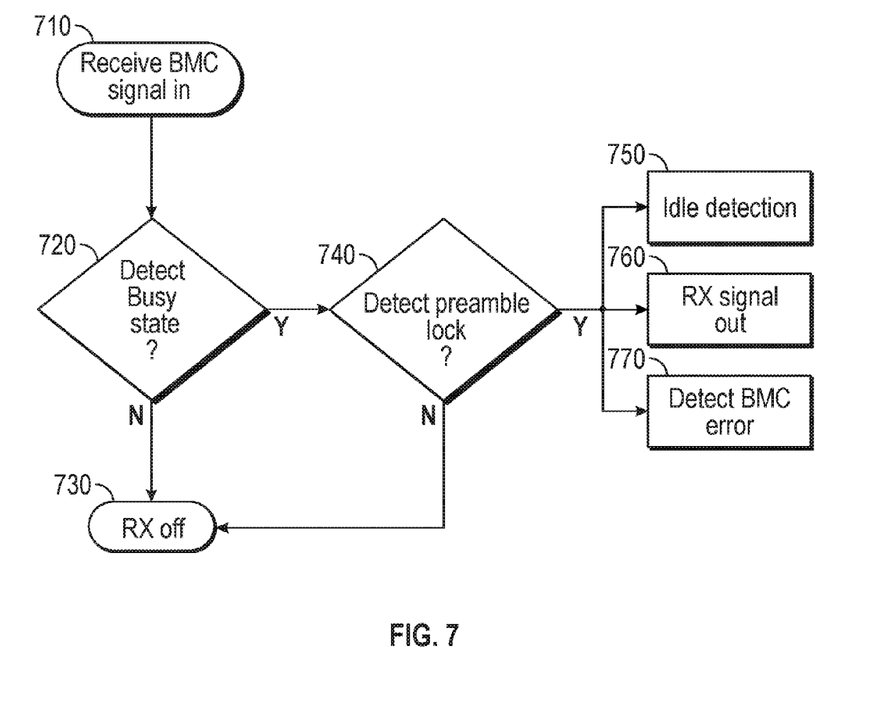
FIG. 7 is a flow diagram of a method for activating a receiver in accordance with an embodiment.

Referring now to FIG. 7, shown is a flow diagram of a method for activating a receiver in accordance with an embodiment. As shown in FIG. 7, method 700 may begin by receiving a BMC signal (block 710). As described above, this signal is received within a chip or other component and provided through an AFE that detects a logic level of the signal. Next at diamond 720 it is determined whether a busy state is detected. In an embodiment, this determination may be based on three triggers within a fixed window, according to a first timer value. In one embodiment, this timer value may correspond to a duration, which can be programmable to 13 microseconds (µs), 15 µs, 17 µs or 19 µs, per the USB Type-C standard. If no such trigger is detected, control passes to block 730 where the receiver may be placed into an off state.

Still with reference to FIG. 7, if a busy detection occurs, control passes to diamond 740 where it can be determined whether a preamble has locked. In an embodiment, this determination may be based on receipt of a predetermined pattern (e.g., 1101) within a fixed window, according to a second timer of programmable duration of 36 µs, 54 µs, 72 µs or 90 µs. If the preamble has locked, control passes to various branches for clock and data recovery operations. At block 760, the received signal is output as a data signal (Data_cdr) along with a recovery clock signal (CK_cdr). Still further, a CDR lock indication signal (CDR_lock) also may be output.

In parallel with this operation, it can be determined whether an idle detection has occurred (block 750). In an embodiment, this idle detection may correspond to three triggers within a moving window, which in an embodiment may be according to a third timer value of programmable to 13 us, 15 us, 17 us and 19 us. Also in parallel with clock and data recovery operations it can be determined whether a data error is detected at block 770. In an embodiment, such error determination may be based on receipt of a predetermined pattern (e.g., 000 or 111) to realize noise rejection.

Figure 8:
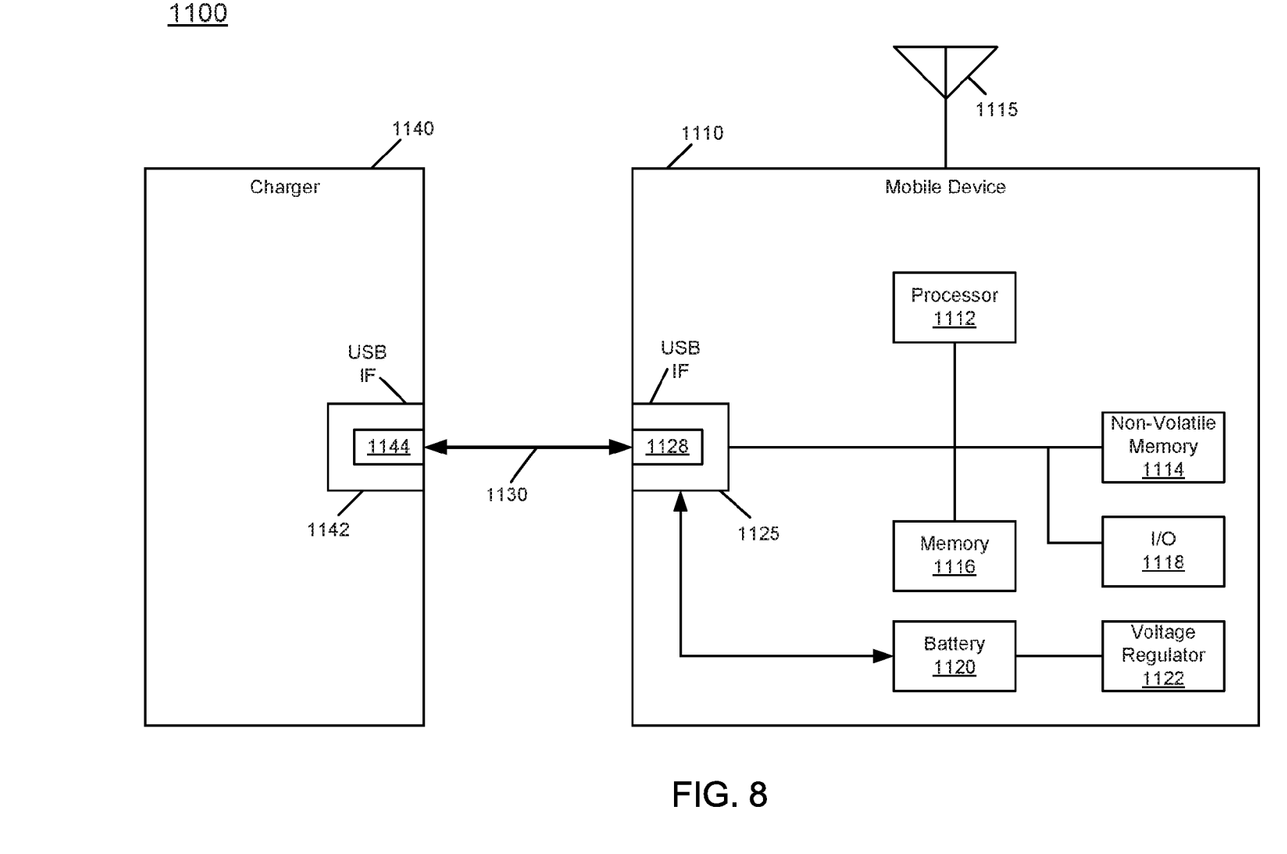
FIG. 8 is a system implementation incorporating a USB Type-C connection technique in accordance with an embodiment.

Referring now to FIG. 8, shown is a system implementation incorporating a USB Type-C connection technique in accordance with an embodiment. As shown in FIG. 8, a system 1100 includes a mobile device 1110, such as a smartphone, tablet computer, laptop computer or so forth that includes a USB-Type C port. As such, via this port, a USB Type-C cable 1130 can couple mobile device 1110 to a charger 1140. Understand that charger 1140 may be a standalone charger, or may be another system that can provide charging capability, such as a laptop computer, desktop computer or so forth.

To enable interconnection and communication of BMC data, charger 1140 includes a USB interface circuit 1142, while mobile device 1110 includes a USB interface circuit 1125, which in this embodiment is implemented as a USB Type-C port. As seen, each of these interface circuits include a corresponding CDR in accordance with an embodiment, namely CDRs 1144 and 1128, respectively. As such, efficient, low power clock and data recovery can occur in these devices as described herein.

As further illustrated in FIG. 8, mobile device 1110 includes at least one antenna 1115 to enable communication, e.g., via a cellular network or other wide area wireless network, a wireless local area network, and/or a global positioning satellite system and so forth. In addition, mobile device 1110 includes a processor 1112, which may be any type of general-purpose processor, system on chip or so forth. As seen, processor 1112 couples to a memory 1116, a non-volatile memory 1114, such as a flash storage or other non-volatile memory, and an input/output circuit 1118, which in an embodiment may be implemented at least in part via a touch screen display. As further shown, when power delivery is from charger 1140 to mobile device 1110, a charging current can be applied to a battery 1120 that in turn powers mobile device 1110 via an internal voltage regulator 1122.

Understand that the various operations described above to configure and operate a reference-less CDR may be realized using instructions stored in a non-transitory storage medium that when executed enable a microcontroller or other control logic to configure and operate the CDR as described herein. While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first time-to-data converter (TDC) to oversample a first duration of incoming data and hold the oversampled first duration during receipt of a second duration of the incoming data;
   a second TDC to oversample the second duration of the incoming data and hold the oversampled second duration during receipt of a third duration of the incoming data, the first and second TDCs to operate in opposing phases;
   a selector coupled between the first and second TDCs and a processing circuit;
   the processing circuit coupled to the first TDC and the second TDC, the processing circuit including a first filter to filter the oversampled first duration and the oversampled second duration and generate a control output therefrom; and
   a digitally controlled oscillator (DCO) coupled to the processing circuit to receive the control output and generate a recovery clock signal therefrom.

2. The apparatus of claim 1, further comprising a data sampler to receive the incoming data and sample the incoming data according to the recovery clock signal.

3. The apparatus of claim 1, wherein the first filter is configured to be in a first filter configuration when the incoming data comprises a preamble and to be in a second filter configuration when the incoming data comprises random data.

4. The apparatus of claim 3, wherein in the first filter configuration, the first filter is to filter a first plurality of the oversampled first and second durations of the preamble, and in the second filter configuration the first filter is to filter a second plurality of the oversampled first and second durations of the random data, the second plurality smaller than the first plurality.

5. The apparatus of claim 4, wherein the first plurality of the oversampled first and second durations comprises single bit durations and multi-bit durations and the second plurality of the oversampled first and second durations comprises single bit durations.

6. The apparatus of claim 1, further comprising:
   a first edge detector to detect a first edge in the incoming data; and
   a first counter to count the first duration of the incoming data, the first counter to be clocked by a system clock signal, the system clock signal having a frequency substantially greater than a frequency of the recovery clock signal.

7. The apparatus of claim 1, further comprising a logic circuit coupled between the first TDC and the processing circuit, the logic circuit to generate a count value for the first duration of the incoming data, the count value comprising a deviation from a predetermined ratio between a system clock signal and the recovery clock signal.

8. The apparatus of claim 1, wherein the incoming data comprises bi-phase mark coded (BMC) data.

9. The apparatus of claim 1, wherein:
   the first TDC is to oversample the first duration of incoming data responsive to a first edge in the incoming data; and
   the second TDC is to oversample the second duration of incoming data responsive to a second edge in the incoming data.

10. The apparatus of claim 9, wherein the first TDC is to be asynchronously reset responsive to the first edge to perform phase tracking.

11. The apparatus of claim 9, wherein the first TDC is to be asynchronously reset responsive to the first edge and further responsive to a predetermined count value of a counter of the first TDC.

12. At least one non-transitory computer readable storage medium comprising instructions that when executed enable a system to:
- oversample a first duration of incoming data in a first time-to-data converter (TDC) and hold the oversampled first duration during receipt of a second duration of the incoming data;
- oversample the second duration of the incoming data in a second TDC and hold the oversampled second duration during receipt of a third duration of the incoming data, wherein the first and second TDCs are to operate in opposing phases;
- configure a first filter to be in a first filter configuration when the incoming data comprises a preamble and to be in a second filter configuration when the incoming data comprises random data;
- filter the oversampled first duration and the oversampled second duration in the first filter coupled to the first and second TDCs and generate a control output therefrom; and
- generate a recovery clock signal in a digitally controlled oscillator (DCO) signal based at least in part on the control output.

13. The at least one non-transitory computer readable medium of claim 12, further comprising instructions that when executed enable the system to receive the incoming data and sample the incoming data according to the recovery clock signal in a data sampler.

14. The at least one non-transitory computer readable medium of claim 12, further comprising instructions that when executed enable the system to:
- provide a system clock signal to the first and second TDCs, the system clock signal having a substantially greater frequency than the recovery clock signal; and
- provide a reference value to adjust the oversampled first duration and the oversampled second duration, the reference value corresponding to a ratio between the system clock signal and the recovery clock signal.

15. An apparatus comprising:
- a first time-to-data converter (TDC) to oversample a first duration of incoming data and hold the oversampled first duration during receipt of a second duration of the incoming data;
- a second TDC to oversample the second duration of the incoming data and hold the oversampled second duration during receipt of a third duration of the incoming data, the first and second TDCs to operate in opposing phases;
- a processing circuit coupled to the first TDC and the second TDC, the processing circuit including a first filter to filter the oversampled first duration and the oversampled second duration and generate a control output therefrom, and a second filter to filter an output of the first filter; and
- a digitally controlled oscillator (DCO) coupled to the processing circuit to receive the control output and generate a recovery clock signal therefrom.

16. The apparatus of claim 15, wherein the first filter is configured to be in a first filter configuration when the incoming data comprises a preamble and to be in a second filter configuration when the incoming data comprises random data.

17. The apparatus of claim 16, wherein in the first filter configuration, the first filter is to filter a first plurality of the oversampled first and second durations of the preamble, and in the second filter configuration the first filter is to filter a second plurality of the oversampled first and second durations of the random data, the second plurality smaller than the first plurality.

* * * * *